US009143693B1

(12) United States Patent
Zhou et al.

(10) Patent No.: US 9,143,693 B1
(45) Date of Patent: Sep. 22, 2015

(54) SYSTEMS AND METHODS FOR PUSH-BUTTON SLOW MOTION

(71) Applicant: Google Inc., Mountain View, CA (US)

(72) Inventors: Changyin Zhou, Mountain View, CA (US); Jiawen Chen, San Francisco, CA (US); Marc S Levoy, Stanford, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/300,959

(22) Filed: Jun. 10, 2014

(51) Int. Cl.
*H04N 5/232* (2006.01)
*H04N 5/225* (2006.01)

(52) U.S. Cl.
CPC .......... *H04N 5/23293* (2013.01); *H04N 5/225* (2013.01)

(58) Field of Classification Search
CPC . H04N 5/23293; H04N 5/225; H04N 5/2625; G03B 41/02
USPC .......................................... 348/231.99, 231.9
See application file for complete search history.

(56) References Cited

U.S. PATENT DOCUMENTS

| 7,142,209 | B2 | 11/2006 | Uyttendaele et al. |
| 8,358,345 | B1 | 1/2013 | Fiore et al. |
| 2009/0303338 | A1* | 12/2009 | Chaurasia et al. ......... 348/222.1 |
| 2010/0091181 | A1* | 4/2010 | Capps .......................... 348/441 |
| 2010/0296798 | A1* | 11/2010 | Koyama ........................ 386/343 |
| 2011/0128433 | A1* | 6/2011 | Shiohara ................. 348/333.09 |
| 2013/0208143 | A1 | 8/2013 | Chou et al. |
| 2013/0342719 | A1* | 12/2013 | Tashiro ..................... 348/222.1 |
| 2014/0071326 | A1 | 3/2014 | Jang et al. |
| 2014/0150026 | A1 | 5/2014 | Mountain |

* cited by examiner

*Primary Examiner* — Mekonnen Dagnew
(74) *Attorney, Agent, or Firm* — McDonnell Boehnen Hulbert & Berghoff LLP

(57) ABSTRACT

Imaging systems can often gather higher quality information about a field of view than the unaided human eye. For example, telescopes may magnify very distant objects, microscopes may magnify very small objects, and high frame-rate cameras may capture fast motion. The present disclosure includes devices and methods that provide real-time vision enhancement without the delay of replaying from storage media. The disclosed devices and methods may include a live view display and image and other information enhancements, which utilize in-line computation and constant control. The disclosure includes techniques for enabling push-button slow motion effects through buffer management and the adjustment of a display frame rate.

20 Claims, 15 Drawing Sheets

SYSTEMS AND METHODS FOR PUSH-BUTTON SLOW MOTION

BACKGROUND

Unless otherwise indicated herein, the materials described in this section are not prior art to the claims in this application and are not admitted to be prior art by inclusion in this section.

Cameras and their associated optics may capture information from scenes that is often better than what unaided human eyes can detect. For example, telescopes can magnify very distant objects, microscopes can magnify very small objects, high frame-rate cameras can capture much faster motion, and so on. However, most examples are designed to store images or video files for replay at a later time. Furthermore, many of the examples are not portable and many of them are designed for specific scientific tasks.

The present disclosure provides systems and methods for a real-time, live view display with image and other information enhancements using in-line computation and constant control. In particular, the disclosure includes techniques for enabling push-button slow motion effects through buffer management and the adjustment of display frame rates.

SUMMARY

In a first aspect, a method is provided. The method includes receiving a sequence of image frames captured by an image-capture device. The sequence of image frames is initially captured at a capture frame rate. The method also includes displaying a representation of a first portion of the sequence of image frames in a live view interface at a first display frame rate. The representation of the first portion is based on a real-time sampling of the sequence of image frames. The method further includes, in response to receiving a control input corresponding to a slow motion effect, storing subsequently-received image frames from the sequence to an image buffer. The subsequently-received image frames are sampled from the sequence at a sampling rate that is greater than the first display frame rate. The method further includes, in response to receiving the control input corresponding to a slow motion effect, using the image buffer to display a representation of a second portion of the sequence in the live view interface. The second portion is displayed at a second display frame rate that is less than the first display frame rate, such that the displayed representation falls behind real time. The method additionally includes in response to a subsequent trigger event, using the image buffer to display a representation of a third portion of the sequence in the live view interface. The third portion is displayed at a third display frame rate that is greater than the first display frame rate, such that the displayed representation catches up to real-time.

In a second aspect, a system is provided. The system includes a live view interface, an image buffer, a control interface, and a control system. The live view interface is configured to display a representation of at least a first, a second, and a third portion of a sequence of image frames. The representation of the first portion is based on a real-time sampling of the sequence of image frames. The representation of the first portion is displayed at a first display frame rate. The control system is configured to, in response to receiving a control input corresponding to a slow motion effect, store subsequently-received image frames from the sequence into the image buffer. The subsequently-received image frames are sampled from the sequence at a sampling rate that is greater than the first display frame rate. The control system is further configured to use the image buffer to display a representation of the second portion of the sequence in the live view interface. The second portion is displayed at a second display frame rate that is less than the first display frame rate, such that the displayed representation falls behind real-time. The control system is also configured to, in response to a subsequent trigger event, use the image buffer to display a representation of a third portion of the sequence in the live view interface. The third portion is displayed at a third display frame rate that is greater than the first display frame rate, such that the displayed representation catches up to real-time.

In a third aspect, a non-transitory computer readable medium is provided. The non-transitory computer readable medium includes instructions executable by a computing device to cause the computing device to perform functions, the functions include receiving a sequence of image frames captured by an image-capture device. The sequence of image frames is initially captured at a capture frame rate. The non-transitory computer readable medium also includes causing a representation of a first portion of the sequence of image frames to be displayed in a live view interface at a first display frame rate. The representation of the first portion is based on a real-time sampling of the sequence of image frames. The non-transitory computer readable medium further includes, in response to receiving a control input corresponding to a slow motion effect, causing subsequently-received image frames from the sequence to be stored in an image buffer. The subsequently-received image frames are sampled from the sequence at a sampling rate that is greater than the first display frame rate. The non-transitory computer readable medium further includes, in response to receiving the control input corresponding to a slow motion effect, causing the image buffer to display a representation of a second portion of the sequence in the live view interface. The second portion is displayed at a second display frame rate that is less than the first display frame rate, such that the displayed representation falls behind real time. The non-transitory computer readable medium additionally includes in response to a subsequent trigger event, causing the image buffer to display a representation of a third portion of the sequence in the live view interface. The third portion is displayed at a third display frame rate that is greater than the first display frame rate, such that the displayed representation catches up to real-time.

These as well as other aspects, advantages, and alternatives, will become apparent to those of ordinary skill in the art by reading the following detailed description, with reference where appropriate to the accompanying drawings.

DETAILED DESCRIPTION

Figure 1A:
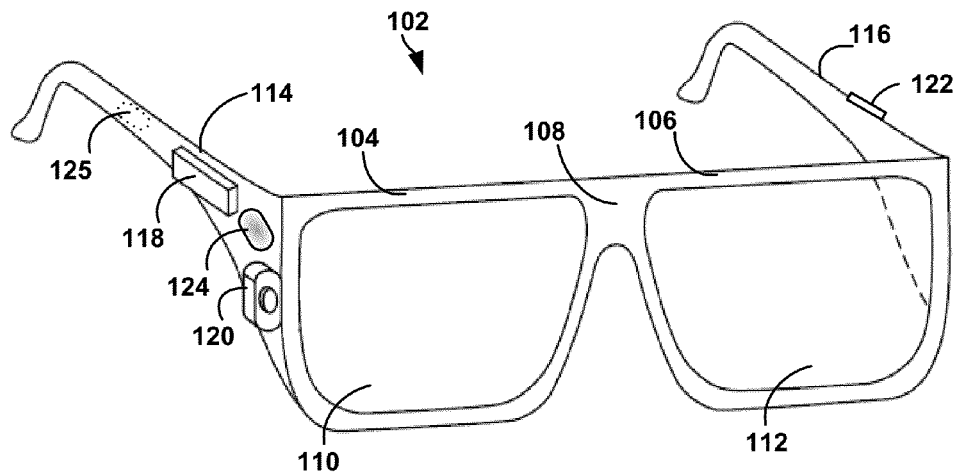
FIG. 1A is a perspective view of an example system, according to an illustrative embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Unless otherwise indicated herein, the materials described in this section are not prior art to the claims in this application and are not admitted to be prior art by inclusion in this section.

An imaging system may capture information about a scene and display a live view representation of the scene to a user in real time. In some imaging systems, the live view representation may include more information or different information than what the unaided human eye may be able to sense. Thus, the live view representation may provide enhanced vision to users.

In an example embodiment, the system may include a live view interface, an image buffer, a control interface, and a control system. The live view interface may include a display, such as may be found on a smartphone, tablet, television, head-mountable display (HMD), or heads-up display (HUD). The live view interface may be configured to display a sequence of image frames and/or a representation of the sequence of image frames. The live view interface may display the sequence of image frames initially at a first display frame rate. The first display frame rate may be within a display frame rate range. The sequence of image frames may be captured by a video camera or other device at a capture frame rate. The image buffer may be configured to temporarily store, queue, or otherwise retain subsequently-received image frames from the sequence of image frames. The image buffer may have a static or dynamic buffer size. Furthermore, if the number of buffered frames reaches a buffer threshold, the control system may increase the buffer size or the "oldest" previously captured image frames may be discarded from the buffer. Optionally, other frames may be selected for discarding from the buffer.

The control interface may be touch-based (e.g. a touchscreen or touch pad). Alternatively or additionally, the control interface may be of a different type. For example, the system may include a voice-based interface or a gesture-based interface.

The control system may be configured to receive various control inputs from the control interface. The control inputs may be associated with a slow motion effect. Control inputs may initiate the slow motion effect, adjust certain characteristics of the slow motion effect while the slow motion effect is in effect, or the control input may stop or remove the slow motion effect. For example, a user may touch a touchpad located on a head mountable display to initiate the slow motion effect. The user may move his or her finger along the touchpad or press harder on the touchpad. The user's finger movements or finger pressure may represent a control input that may act to adjust the slow motion effect. For example, by moving the user's finger downward on the touchpad, the slow motion effect may slow the representation of the previously captured frames even further and/or stop apparent motion altogether. The disclosure also contemplates control inputs that may allow users to "roll back" the video stream to present a backwards-in-time-running video stream. When the user lifts his or her finger from the control interface (or another signal is given), the control system may transition out of slow motion mode by increasing the display frame rate. Further, the display frame rate may optionally be increased to be greater than the capture frame rate. For instance, while transitioning out of the slow motion effect (or while a finite number of frames are buffered, the displayed representation may exceed a "normal" rate of time passage and/or look like a "fast forward" view of the previously captured frames. The control system may use this "fast forward" view so as to return the displayed representation to substantially actual time. Other ways to "transition out" of the slow motion effect are possible and contemplated herein. The control system may be further configured to adjust the display frame rate in response to receiving the control input.

In one embodiment, a user may be wearing a head-mountable device with an attached camera, control interface, and a display. The user may be attending a soccer game and a display of the head-mountable device may initially provide a live view representation via the display similar to what the user might normally see in his/her field of view. In addition to a "normal" live view representation, a user interface may be presented to the user. For example, a row of icons, buttons, text, and/or shapes could appear in a portion of the live view representation.

The user may initiate a slow motion effect by, for example, pushing on the touch-sensitive surface in a location related to one of the user interface buttons. In response to the control input, the representation of the sequence of images may appear to the view as a slowed-down representation of the real world. For example, a soccer ball flying through the air could appear to the user as though it were moving slower than normal. In other words, movements in a viewfinder or display may appear significantly slowed, perhaps by 10 times.

Optionally, users may further adjust the slow motion factor by touch gesture or any other way to convey a control input. When done with the slow motion mode, a user may lift his or her finger from the control interface. Thus, the display frame rate may be sped up beyond normal speed so that the displayed representation of the sequence of images may appear as if "fast forwarding" to near real-time, and then reducing the display frame rate to match the capture frame rate and enter real-time display situation.

It should be understood that the above embodiments, and other embodiments described herein, are provided for explanatory purposes, and are not intended to be limiting.

II. ILLUSTRATIVE SYSTEMS

The disclosure describes a system and user interface for controlling real-time vision enhancement effects in one device such as push-button slow motion. Specifically, the disclosed system may, in response to a control input, apply a slow motion effect to an image stream. Users may interact with a device or display by touch, voice, and/or gesture command so as to slow displayed images, adjust the slow motion effect, and remove the slow motion effect.

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124 or a touch-based control interface. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 or touch-based control interface is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Figure 1B:
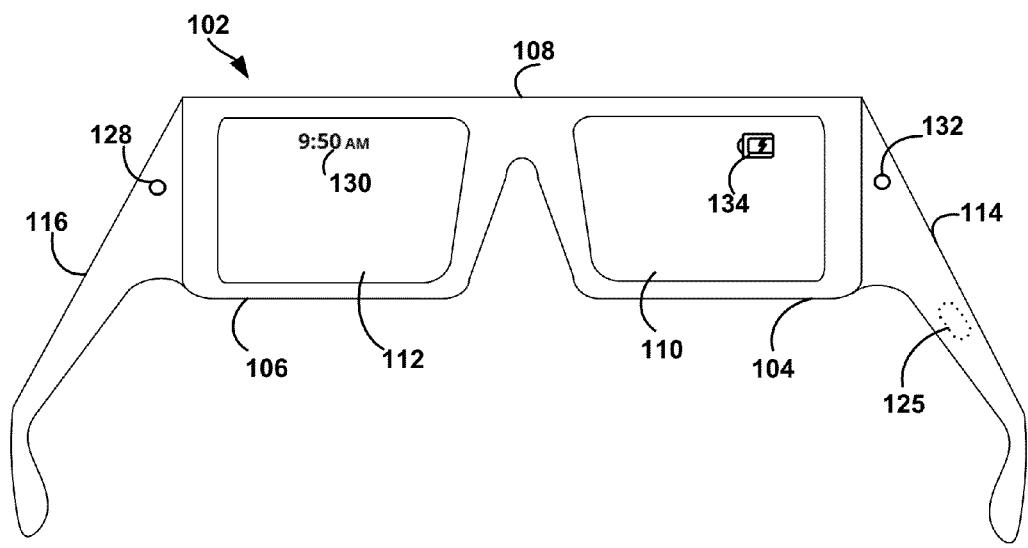
FIG. 1B is a perspective view of an example system, according to an illustrative embodiment.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

The camera 120 may be a part of an imaging subsystem that may be configured to capture visual information from a field of view of camera 120. Camera 120 may be configured to capture images at a high frame rate, such as 240 Hz. Other frame rates are possible. Camera 120 may also be configured to capture images at a number of different frame rates. The visual information from camera 120 is processed by a processor (not shown) and may be presented on lens elements 110 and/or 112 in real time. The type and degree of effect application to the live view representation is controlled by users in real time, via the finger-operable touch pad 118.

Camera 120 may represent one, two, or more image capture devices configured to operate in various modes. For example, when capturing images for the slow motion effect, only one camera operating at high frame rate is required. Frames (captured at high frame rate) may be buffered in memory; and a program running on the system picks the right frame to display at a proper time and at a proper frame rate, according to user interaction via the finger-operable touch pad 118.

The one or more image-capture devices could include, but should not be limited to, cameras, sensors, imaging systems, or photosensors. The image-capture devices may be configured to capture images of a field of view. The image-capture devices may be configured to detect wavelengths of light at least partially within the visible light spectrum. Additionally or alternatively, the image-capture devices may be configured to capture images in the infrared spectrum, or at other wavelengths and/or within other wavelength bands.

When capturing image data for the low light effect, camera 120 may represent a RGB camera and a black and white camera running simultaneously. The black and white camera captures less noisy images with no color, and RGB camera captures color images with relatively more noise. Images from the black and white and RGB cameras may be combined into clean RGB images on-the-fly, which may be displayed instantly via the lens elements 110 and/or 112. The user may control the level of brightness and/or color saturation by simple user interactions in real time via the finger-operable touch pad 118.

User interaction in real time via the finger-operable touch pad 118 may alternatively or additionally control how many cameras and/or which camera(s) may operate.

Figure 1C:
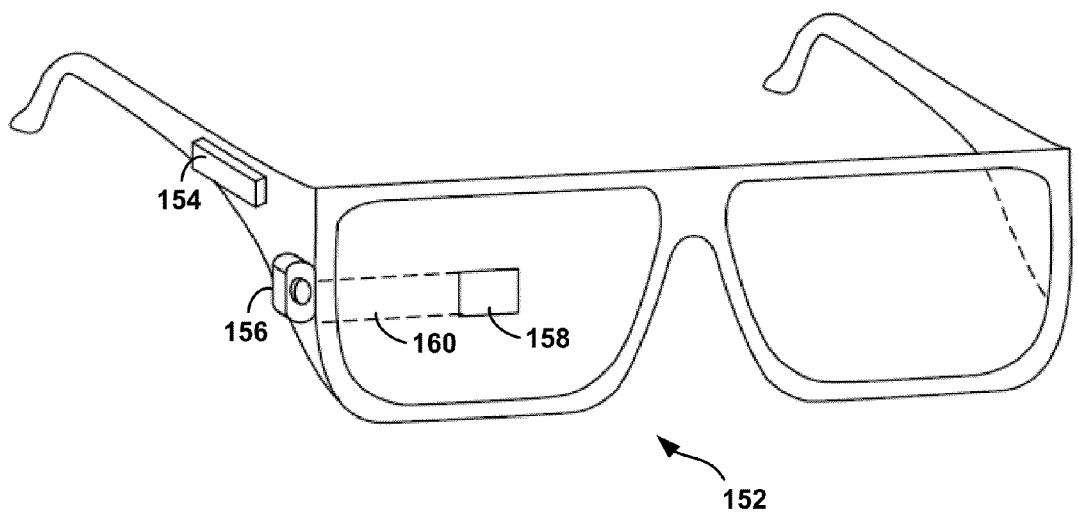
FIG. 1C is a perspective view of an example system, according to an illustrative embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well, or may be embedded into or otherwise attached to the frame.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
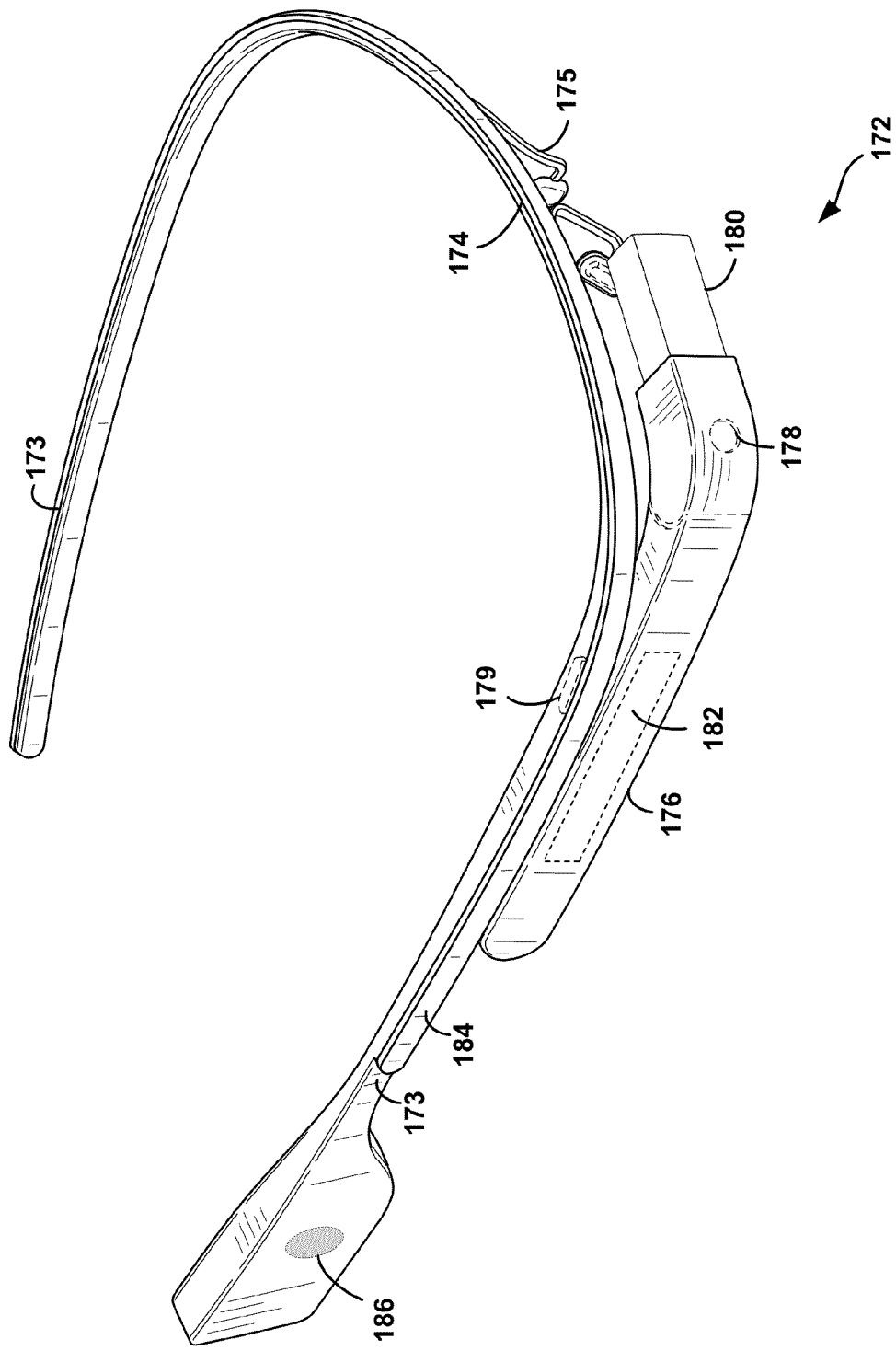
FIG. 1D is a perspective view of an example system, according to an illustrative embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

The HMD 172 may also include a finger-operable touch pad 182, which may be similar or identical to the finger-operable touch pad described and shown in FIG. 1A–1C.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
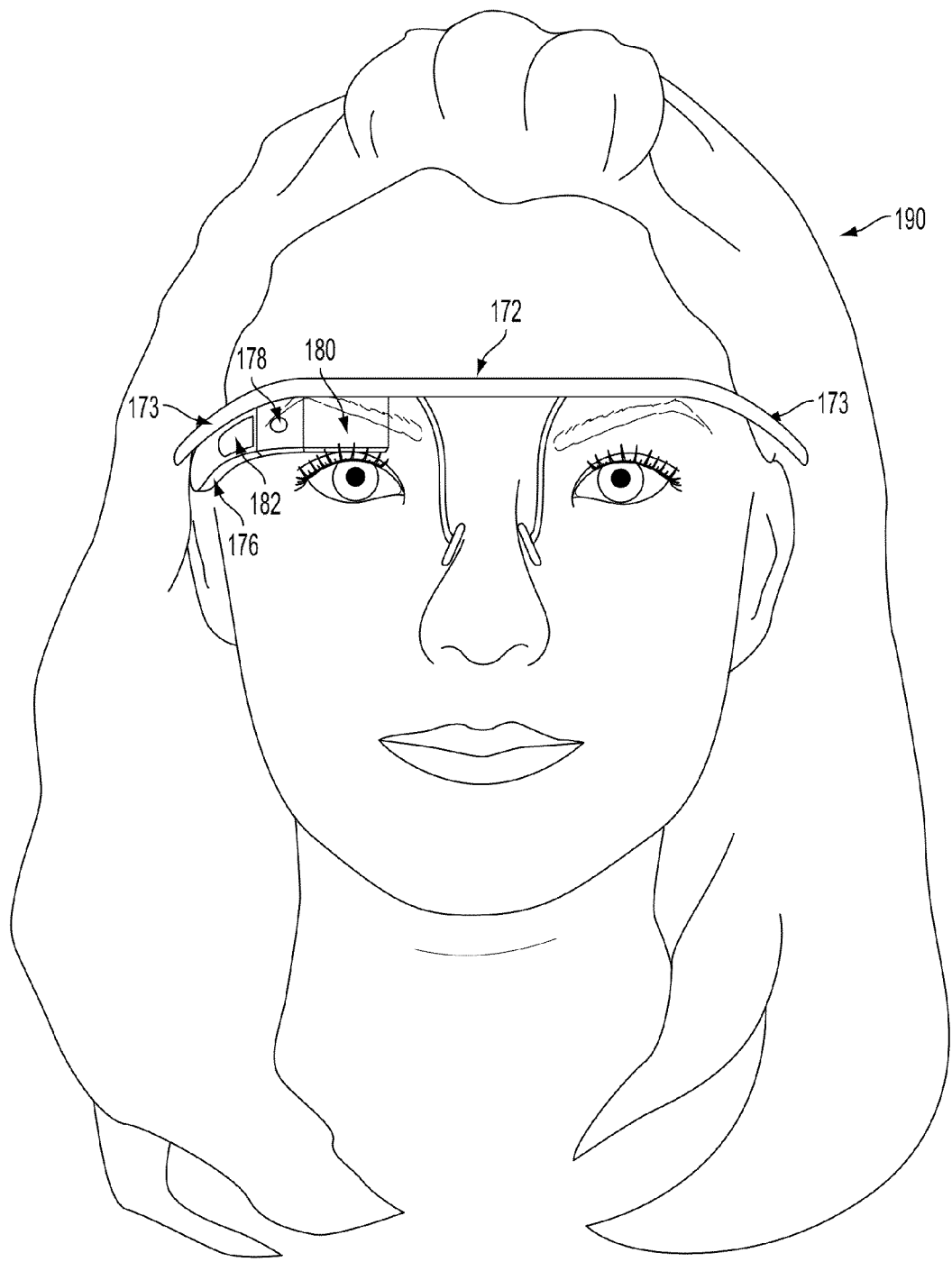
FIG. 1E is a perspective view of an example system, according to an illustrative embodiment.
Figure 1F:
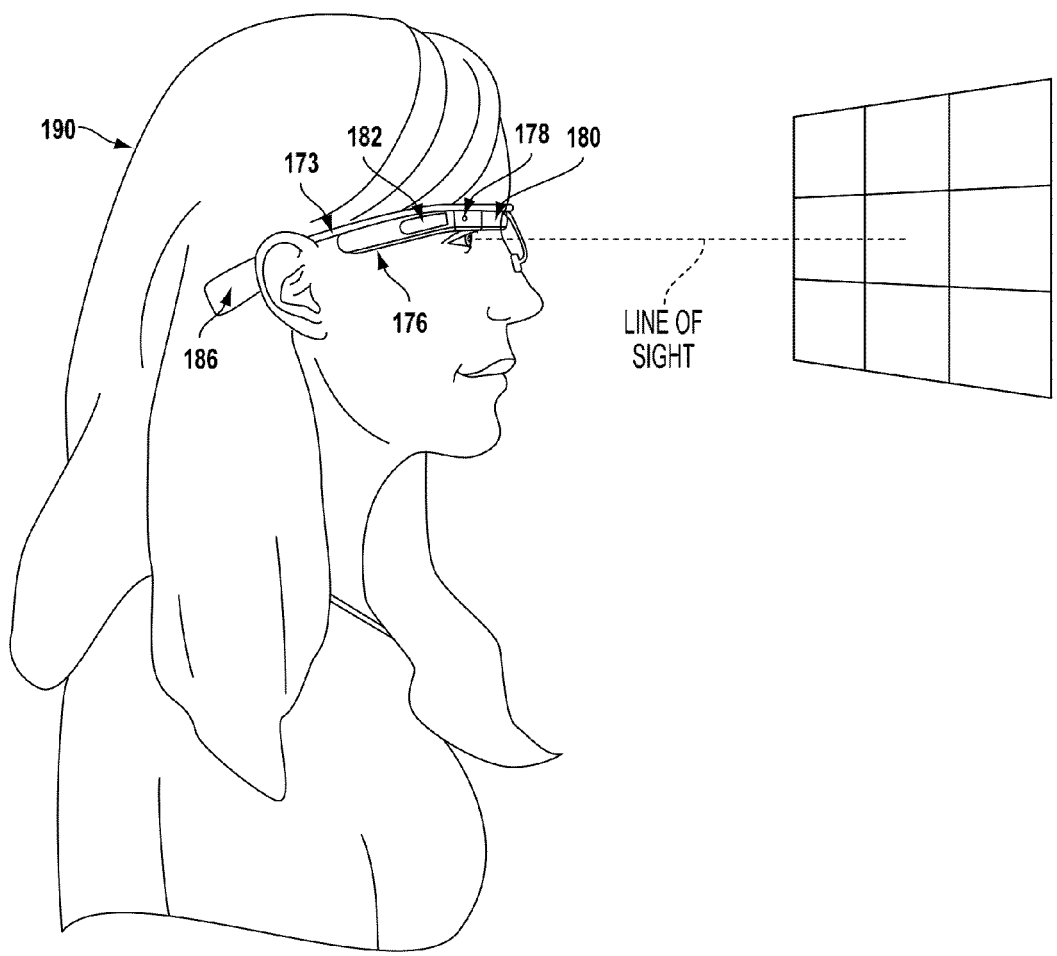
FIG. 1F is a perspective view of an example system, according to an illustrative embodiment.
Figure 1G:
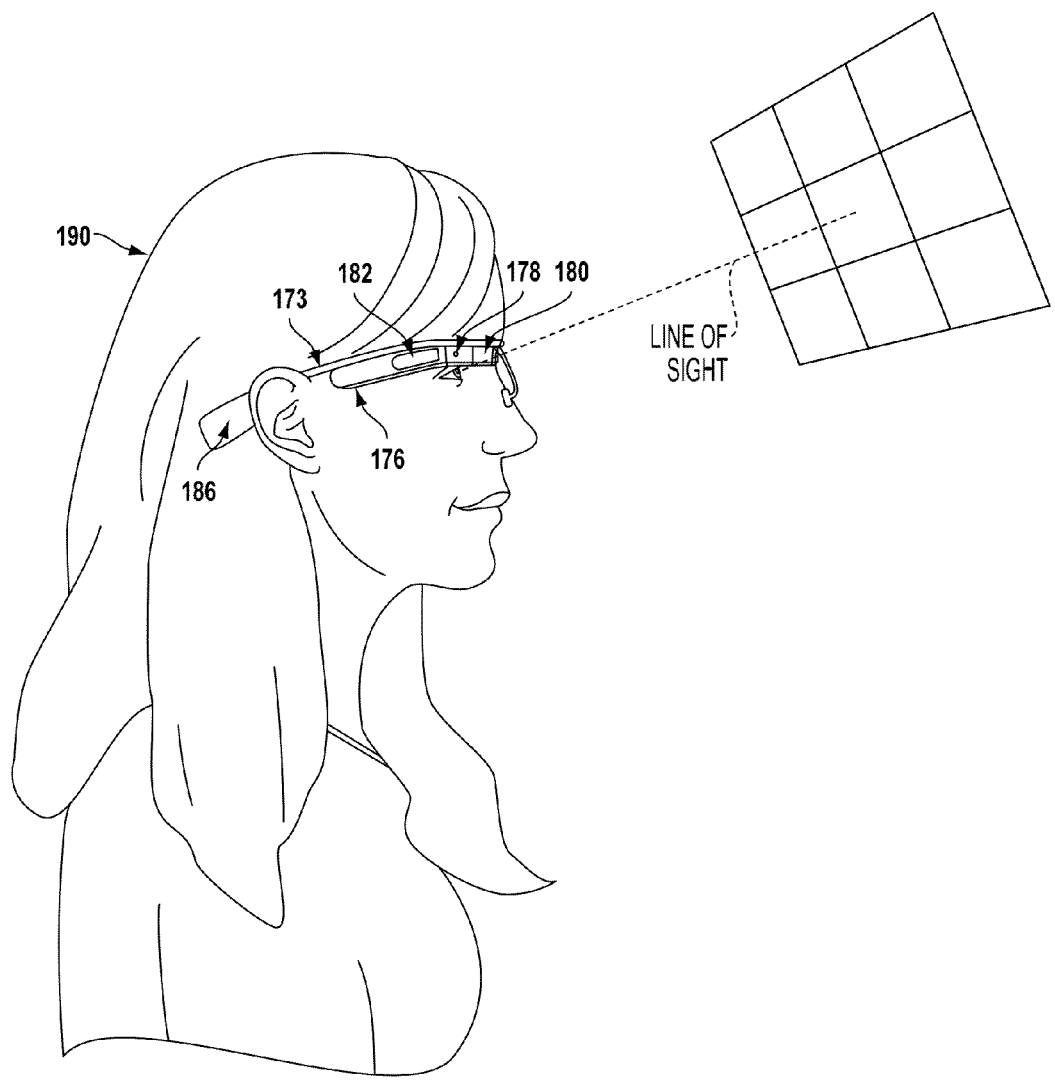
FIG. 1G is a perspective view of an example system, according to an illustrative embodiment.

FIGS. 1E to 1G are simplified illustrations of the HMD 172 shown in FIG. 1D, being worn by a wearer 190. As shown in FIG. 1F, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2A:
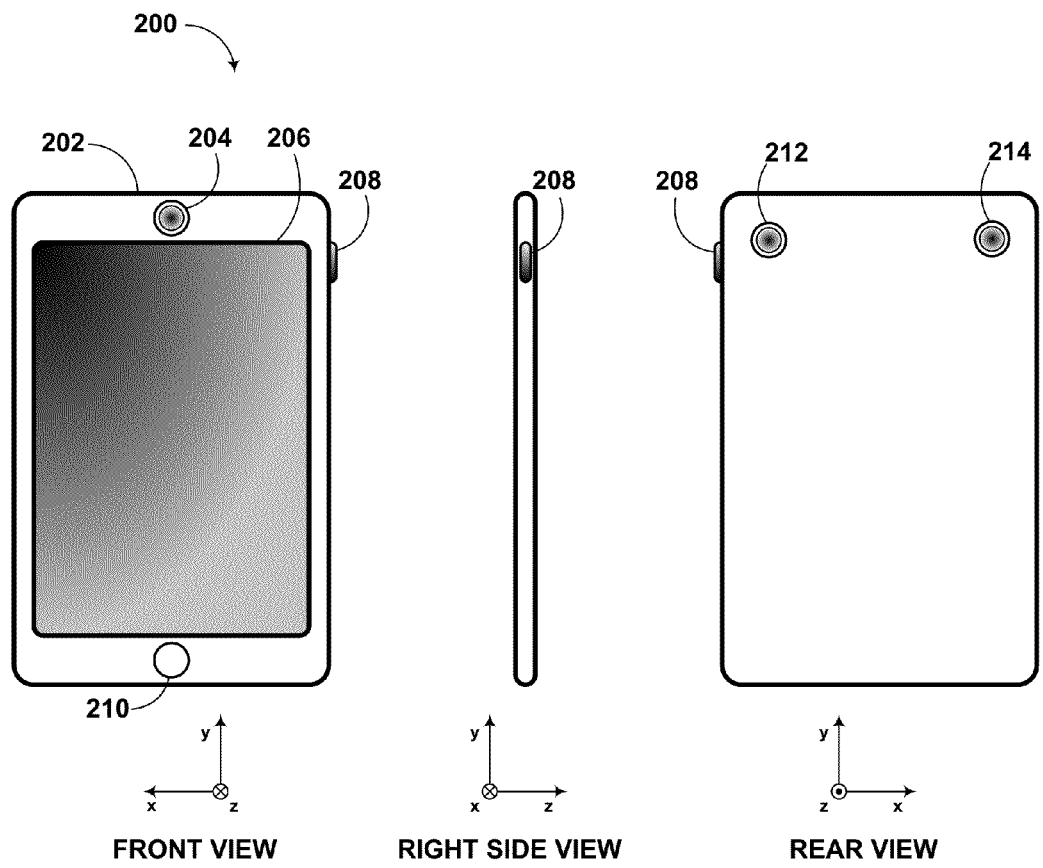
FIG. 2A is a perspective view of an example system, according to an illustrative embodiment.

In another embodiment, the system may take the form of other devices with a display or screen, such as mobile phones, tablets, PCs, etc. For example, as depicted in FIG. 2A, system 200 may configured like a smartphone or tablet. System 200 may include a body 202, a main button 210, a secondary button 208, a first camera 204, a second camera 212, and a display 206. The display 206 may optionally include a touch-sensitive surface.

For example, display 206 may provide a representation of a sequence of image frames based on image data from the first camera 204 and/or the second camera 212. A third camera 214 may be included. In some embodiments, multiple cameras may provide stereoscopic imaging, multispectral imaging, or other capabilities. A control system (e.g. a processor, not shown) may be configured to generate the representation of the sequence of image frames and receive a control input corresponding to two or more effects. The control input may be entered via a touch-sensitive surface, the main button 210, and/or the secondary button 208. The control system may be further configured to respond to the control input by applying the effect to the representation of the sequence of image frames in real time.

Figure 2B:
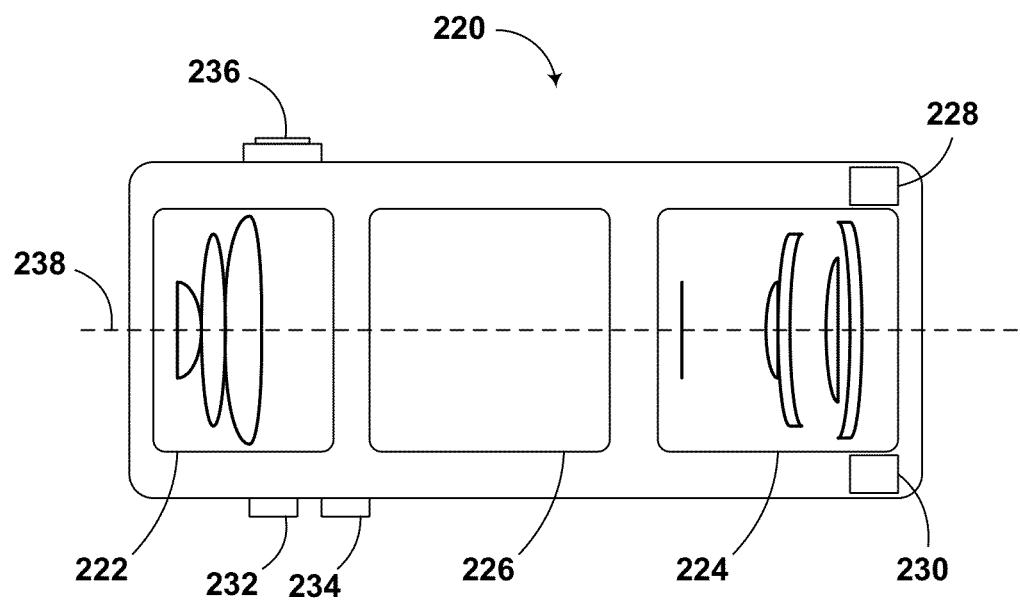
FIG. 2B is a schematic diagram of an example system, according to an illustrative embodiment.

FIG. 2B is a schematic block diagram of an illustrative system 220. System 220 may represent a monocular or binocular optical system viewable by a user. System 220 may include optical elements such as eyepiece 222, which may also represent an ocular lens. System 220 may also include an objective lens 224, and other elements 226. The other elements 226 may include, for example, processors and/or sensors. The system 220 may include components similar to a telephoto camera. The optical elements of system 220 may share a common optical axis 238. Alternatively, the optical elements need not share the same optical axis. System 220 may include an alternative light source or flash 228 and/or a wide field of view camera 230. System 220 may include a power button 232, a mode switcher 234, and a main control 236. In some embodiments, system 220 may be approximately 3 inches long and 1 inch in diameter. Other sizes and form factors of system 220 are possible.

Figure 3:
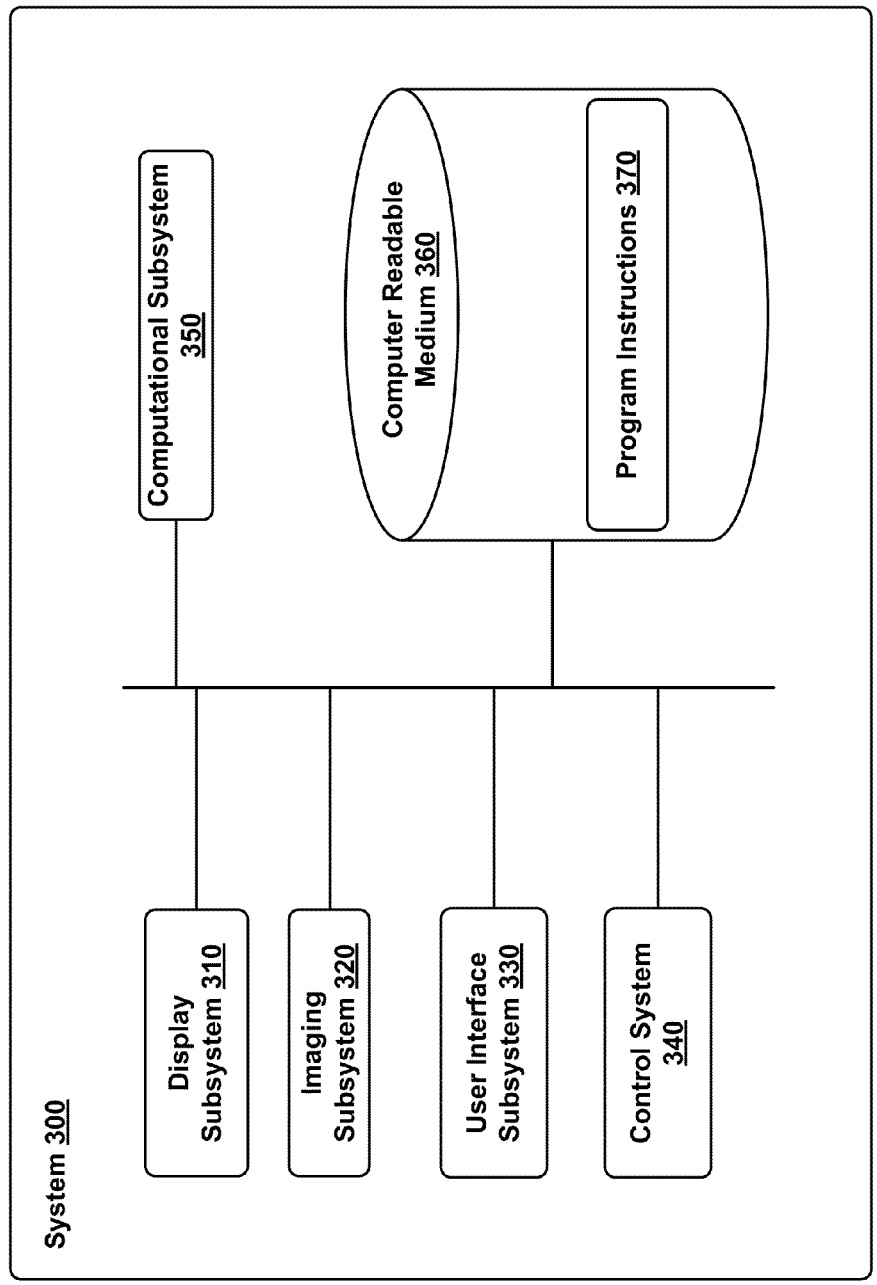
FIG. 3 is a functional block diagram of an example system, according to an illustrative embodiment.

FIG. 3 is a schematic block diagram of an illustrative system 300. The system 300 may include a display subsystem 310, an imaging subsystem 320, a user interface subsystem 330, a control system 340, a computational subsystem 350, a computer readable medium 360, and program instructions 370. System 300 may include more or fewer subsystems and/or components.

Image capture and real-time display may be performed computationally. Thus, various algorithms may be utilized to make transitions between the applied effects smooth. For example, when transitioning out of the slow-motion effect, the computational subsystem 350 and/or the display subsystem 310 may gradually reduce the rate of slow-down and/or speed up the representation of the sequence of images so as to appear smooth and/or more aesthetically pleasing to a user.

The user interface subsystem 330 may generally include a power button, a mode switch/button, and/or one or more controllers to allow users to turn on/off the device, switch modes, and control the level of vision enhancement. The user interface subsystem 330 may include a touch-sensitive surface (e.g. touch pad). A small display panel or a portion of the main user display may be provided to inform the user of the current state of the system and/or effect applied. The user interface subsystem 330 may include a touch pad that need not be part of the display. In other words, the user interface subsystem 330 may include a touch-sensitive surface distinct from the display.

The user interface subsystem 330 may be configured to accept a control input, such as a signal from a touch pad or other touch-sensitive surface. Many control inputs are possible, but single finger touch/swipe, double finger touch/swipe, multi-finger touch, and holds are all contemplated within the scope of the disclosure. Additionally, control inputs may include other ways of forming symbols, shapes, or letters via the touch-sensitive surface.

Although a touch-based control interface is disclosed within the context of user interface subsystem 330, other types of control interfaces are contemplated. For example, the user interface subsystem 330 may include a voice-based or a gesture-based control interface. Correspondingly, control inputs generated by user interface subsystem 330 may be triggered or initiated by voice or gesture commands from a user.

Upon receipt of the control input, the control system 340 may add, subtract, and/or modify two or more effects applied the live-view representation. Furthermore, the control system 340 may modify at least a first and second effect with respect to one another, which may affect the live-view representation. For example, a user may initiate a slow-motion effect. In such a scenario, in response to the user moving a finger upward on the touch-sensitive surface, the control system may modify the slow-motion effect with respect to a speed-up effect or another effect. Other combinations of effects are possible.

The computational subsystem 350 may include processors, memory, storage, and communication means (like WiFi and Bluetooth). The computational subsystem 350 may control the flow of information from the other subsystems; it may process images/video from the imaging subsystem 320. The computational subsystem 350 may (according to effect(s) applied and user interaction) process and fuse images from different sensors; and it feeds processed images/video to the display subsystem 310 instantly. In some implementations, at least some of the computational subsystem 350 may include cloud computing resources. In other words, the computational subsystem 350 may include processing capabilities that are remote from the display subsystem 310 and/or the imaging subsystem 320.

Figure 4:
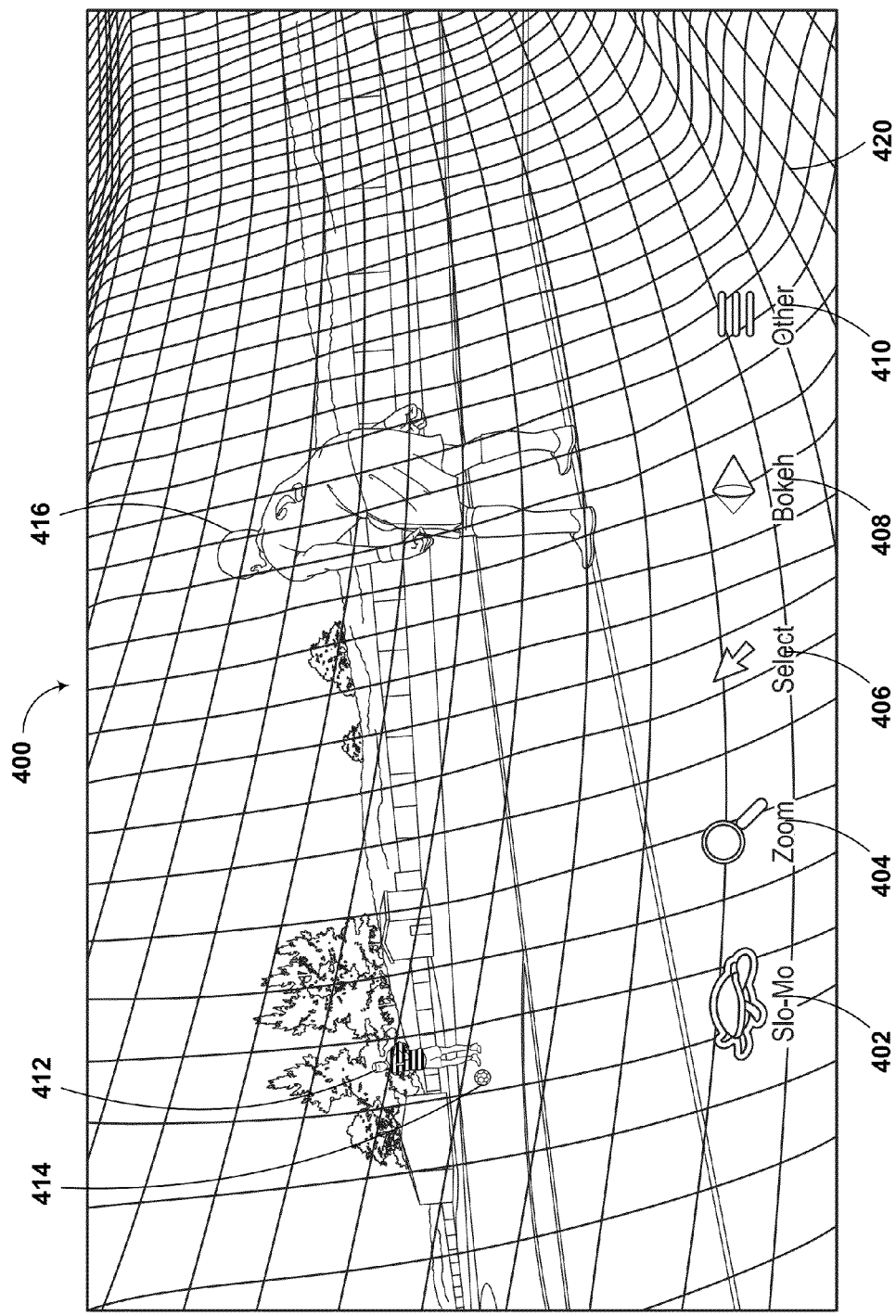
FIG. 4 depicts a scene, according to an illustrative embodiment.

Generally, systems and methods disclosed here may include the application of a slow motion effect to a representation of a sequence of image frames. FIG. 4 depicts a scenario 400 according to an illustrative embodiment. Scenario 400 could include a soccer player preparing to kick a ball toward a soccer goal and goalkeeper. Scenario 400 may also represent a live-view representation viewable by a user of the HMD or another display type. As such, the live view representation may include a user interface. The user interface may include icons, words, and/or other indicators (e.g. lights and/or sounds) that may be associated with effects applicable to the live view representation. For example, the icons may include a slow motion icon 402, a zoom icon 404, a select icon 406, a bokeh icon 408, and an other icon 410. The representation may further include a soccer player 412, a ball 414, a goalkeeper 416, and a net 420.

User interaction via the control interface may cause a slow motion effect to be selected, initiated, modified, or removed from the representation of the sequence of image frames. Such a selection or initiation may cause a corresponding slow motion icon to be highlighted, illuminated, underlined, enlarged, or otherwise identified. For example, the slow motion icon 402 may have a lighted outline as depicted in FIG. 4.

Figure 5A:
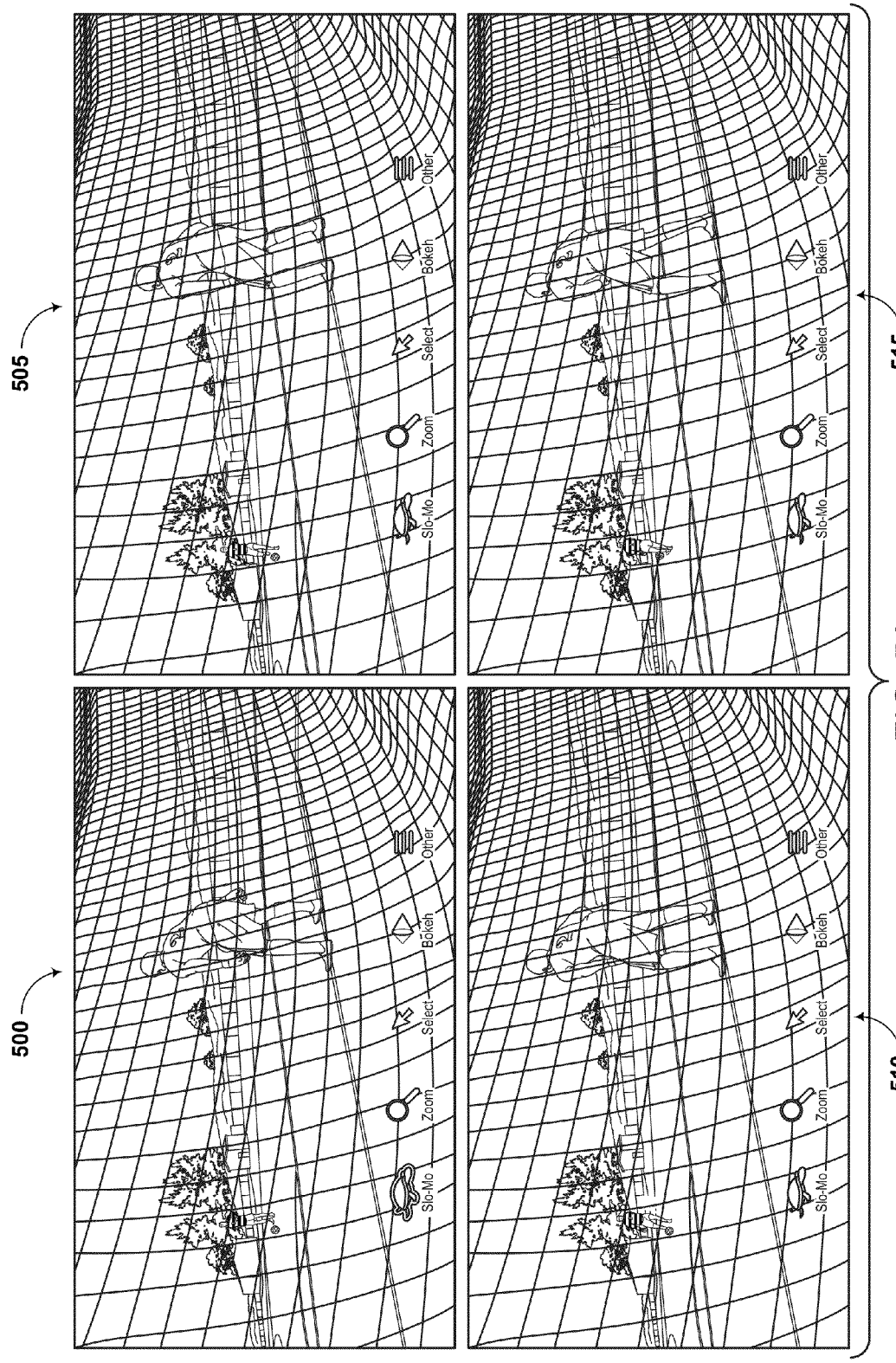
FIG. 5A depicts four scenes, according to an illustrative embodiment.

FIG. 5A depicts four successive images that occur after scenario 400. Each of the images may represent a live view representation viewable by a user via a display. For example, images 500 and 505 may depict the soccer player preparing to kick the ball toward the goalkeeper. Image 510 may include the soccer player making contact with the ball. Image 515 may include the ball in the air moving toward the goalkeeper.

Figure 5B:
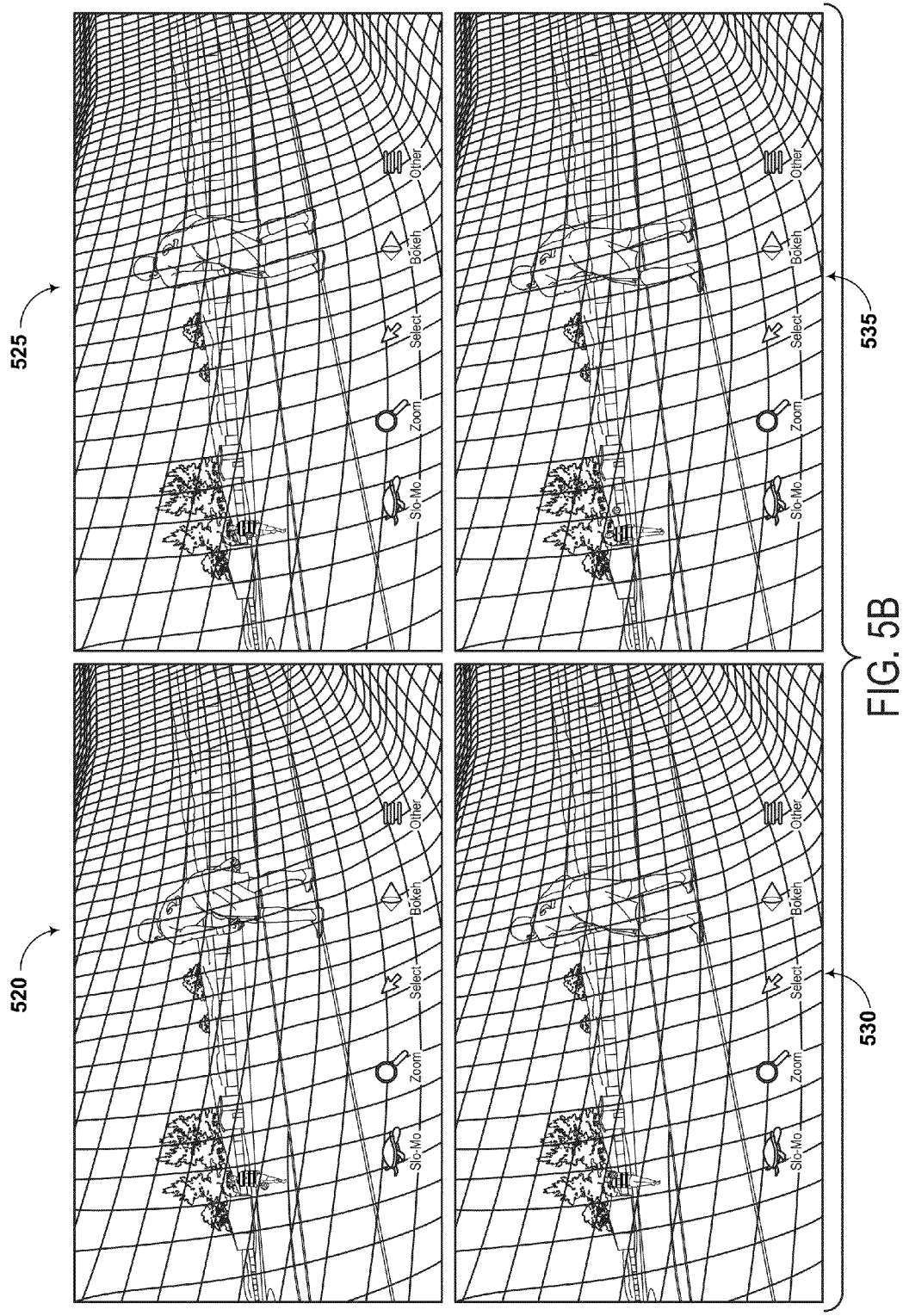
FIG. 5B depicts four scenes, according to an illustrative embodiment.
Figure 5C:
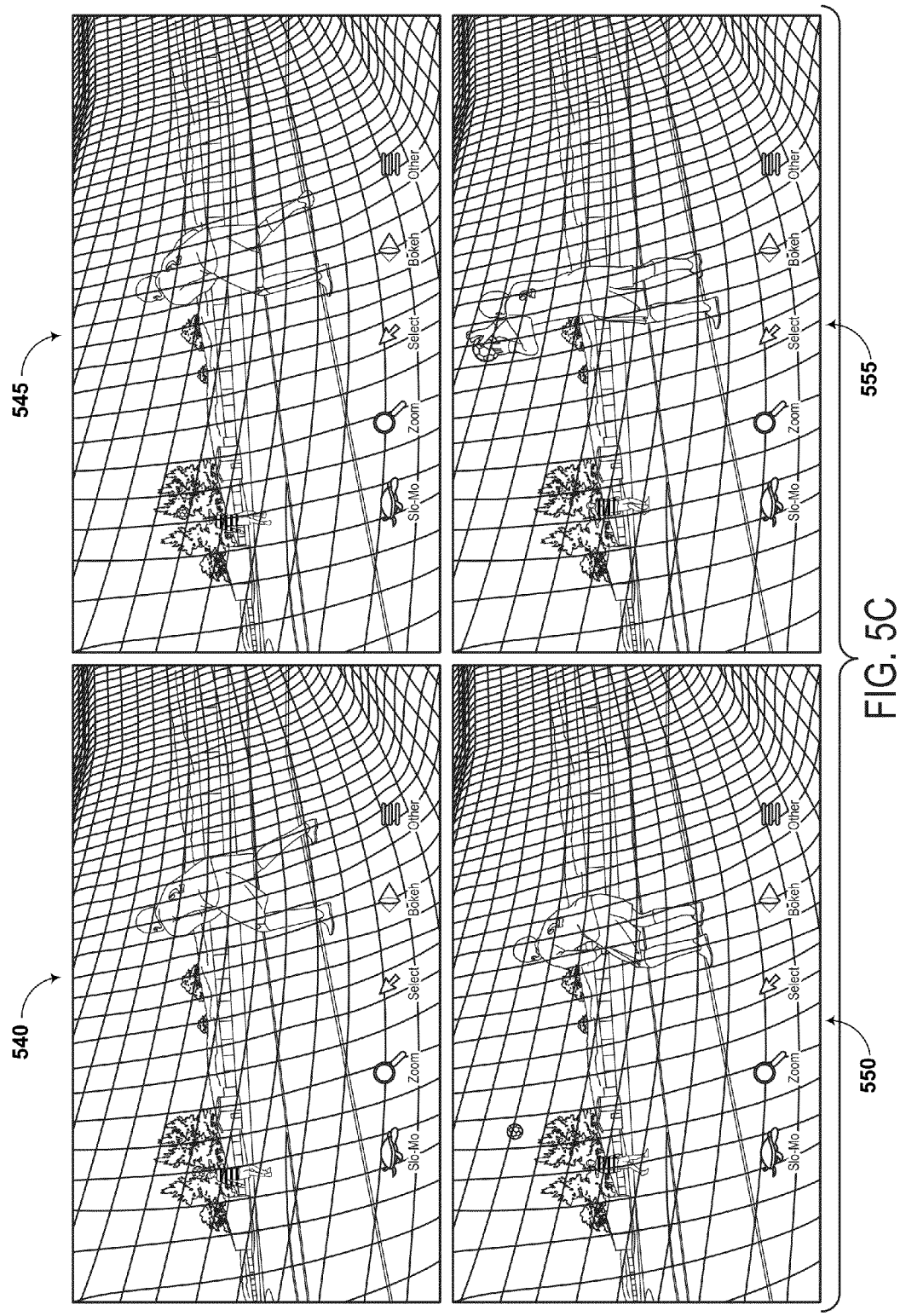
FIG. 5C depicts four scenes, according to an illustrative embodiment.

FIG. 5B depicts four successive images that occur after image 515. For example, images 520, 525, 530, and 535 may depict the ball moving closer to the goalkeeper. FIG. 5C depicts four successive images that occur after image 535. Images 540, 545, and 550 may depict the ball moving yet closer to the goalkeeper. Image 555 may include the goalkeeper making a save on the ball with his/her hands.

Although FIGS. 5A-C depict twelve images, more or less images may be captured by the system over the representative time frame. For example, images may be captured (and possibly displayed via the display) at 240 Hz or at another frequency.

If the slow motion mode is activated, for instance in response to a user interaction via the control interface, the representation may include images from FIGS. 5A-C. However, the displayed images may be displayed at a higher display frame rate, and/or at a lower display frame rate, compared to the real time scene. For example, if the images from FIGS. 5A-C were initially captured 100 milliseconds apart, the live view representation viewable by a user may display the representative images with 200 milliseconds between representative images. The displayed representation may thus appear to a user as though the ball is moving more slowly toward the goalkeeper. In some embodiments, the displayed representation, and thus the image buffer, may include other actual captured frames, duplicate frames, or interpolated frames so as to make the slow motion sequence appear more smoothly. For example, if frames are interpolated into the image buffer on a 1:1 ratio, the slow motion effect may be doubled or otherwise increased.

Figure 6:
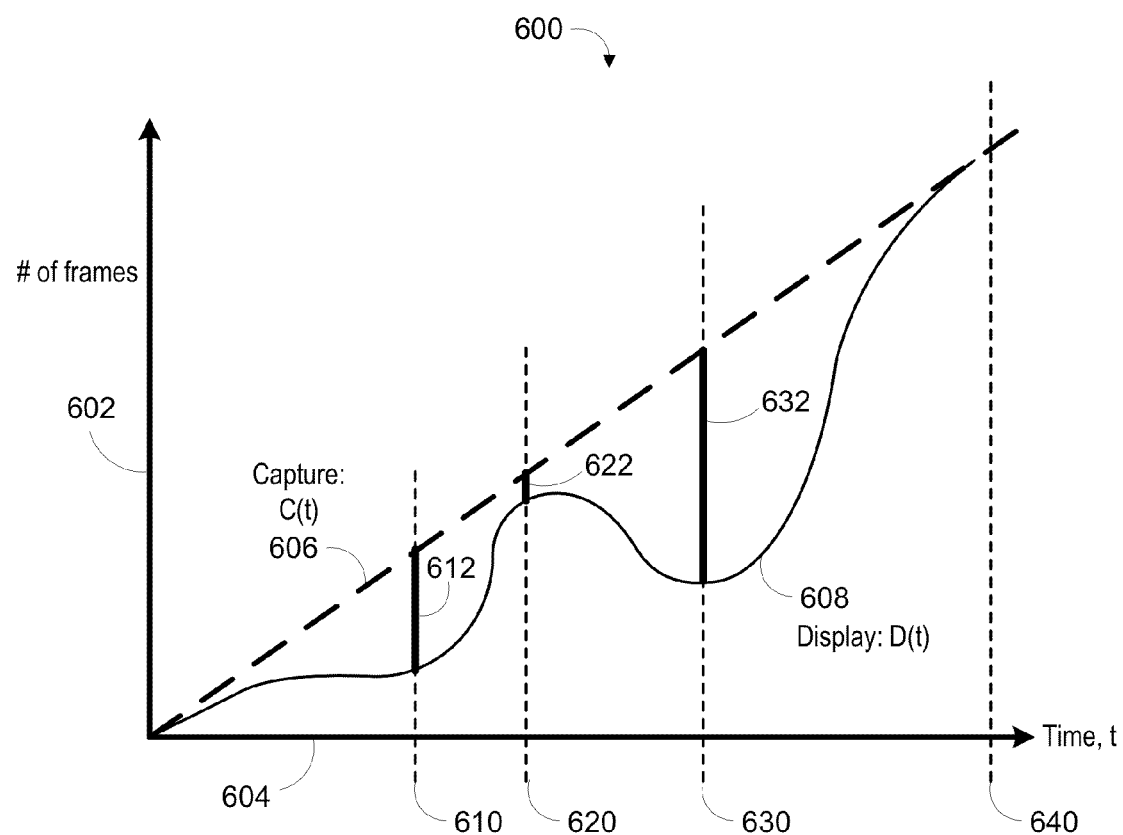
FIG. 6 depicts a schematic chart, according to an illustrative embodiment.

FIG. 6 is a schematic illustration according to an illustrative embodiment. A schematic graph 600 may include a number of frames axis 602, a time axis 604, the number of captured frames at a given time "C(t)" 606, and a number of displayed frames at a given time "D(t)" 608. The number of captured frames C(t) 606 increases at a constant speed because the capture frame rate is assumed to be constant here. D(t) 608 may vary with time, according to user input. The derivative of D(t) 608 is the display frame rate. When the display frame rate is equal to the capture frame rate, a user may observe a normal speed representation of the sequence of image frames. When the display frame rate is lower than the capture frame rate, a slow motion effect is produced. Furthermore, when the display frame rate is higher than the capture frame rate, a fast-forward situation arises. When the display frame rate is less than zero, frames may be displayed in a reverse temporal order—this produces the effect of playing a sequence of image frames backward (rewind). However, the fundamental limit is C(t)>=D(t), so therefore one can display a frame that has not been captured.

A variety of display frame rates may be utilized according to user input to achieve various viewing experiences. For example, in response to the control input that initiates the slow motion effect, the display frame rate may be immediately decreased to a minimum (e.g. 24 fps) to ensure the most possible available buffer space. In the alternative, when users signal to enter slow motion mode, the control system may reduce the display frame rate smoothly and gradually "ease" the display frame rate into the capture frame rate.

When the user lifts his or her finger or otherwise dismisses or removes the slow motion effect, the display frame rate may be immediately adjusted to be equal to the capture frame rate. Alternatively, the control system may "ease" out of slow motion by smoothly increasing the display frame rate so that the displayed representation of the sequence of images may appear to be "fast forwarding" through the sequence of images. When the number of displayed frames approaches the number of captured frames, the display frame rate may be decreased to be equal to the capture frame rate.

The schematic graph 600 may further include various time points 610, 620, 630, and 640. At the origin of the graph 600, a user may initiate a slow motion effect. In such a scenario, the display frame rate (the derivative of D(t) 608) will decrease and buffered frames will begin to accumulate in the image buffer. As discussed elsewhere in this disclosure, the display frame rate need not be limited by a hardware display or device. Rather, the display frame rate is an idealized display rate for visualization purposes. In practice, the sampling rate from the sequence of image frames may be changed and the physical display frame rate may be constant, e.g. 24 frames per second. Thus, in practice, sampling rates, display frame rates, and capture frame rates may vary. Additionally, the displayed representation of the sequence of image frames will appear as if in slow motion. A first buffered frame number 612 may represent the number of buffered frames at time point 610. Between time point 610 and time point 620, a user may increase the display frame rate such that the displayed representation appears to move faster than real-time. Accordingly, the buffered frames will be displayed at a more rapid rate than the rate at which the image buffer is being filled. A second buffered frame number 622 may represent the number of buffered frames at time point 620. A third buffered frame number 632 may represent the number of buffered frames at time point 630. After time point 630, the user may take his or her finger off the control interface so as to remove the slow motion effect. In response, the display frame rate may increase above the capture frame rate, which may begin to empty the image buffer. As the number of displayed frames approaches the number of captured frames at any point in time, the control system may be configured to "ease" the display frame rate back down to the capture frame rate and real-time. At time point 640, D(t) 608 has matched C(t) 606 and no frames are being buffered. Thus, the displayed representation may be considered in "real-time" at time point 640.

The factor of slow motion is usually defined as the ratio of capture frame rate to the display frame rate. For example, image sensors in some existing smart phones can operate in a high speed mode, like 720 p@120 fps. Then, this invention can be realized on these devices to achieve 5× slow down (5=120 fps/24 fps).

Due to a finite buffer size, a real system may not be able to retain all possible buffered frames in memory. Thus, several methods are disclosed herein for buffer management. For example, a first design contemplates zero or few frames for backward play mode. In other words, when users signal to enter slow motion mode, only the frames in a limited time window, or zero time window, are available for buffering and displaying. Thus playing backward may only be done for a limited time, depending on how many images were buffered before entering slow motion mode.

A second buffer management design allows zero or limited frames for slow motion. When a user signals to enter slow motion mode, only frames in a limited time window (or no time window) are possible for buffering or display. Thus the use of slow motion may only take place for a limited time (or not allowed).

A third buffer management design retains only a portion of captured frames during any given time period. In other words, frames may be sampled from the sequence of image frames for buffering purposes. The sampling may be performed based on several variables such as the number of buffered frames, a buffer threshold, etc.

Frame sampling may be performed in several different ways as contemplated herein. In one embodiment, "simple subsampling" may repeatedly select or sample a given frame from a given set of frames, e.g. sampling one frame uniformly from every ten frames. In another embodiment, a given set of frames could be "binned" or averaged (by equal or weighted averaging), e.g. for every ten frames, take an average of those ten frames to be the sampled frame.

In a further embodiment, "smarter interpolation" may be performed, which may include picking or producing a sampled frame based on the output from neighboring frames. For example, if one frame for every 2.5 frames is desired, the sampled frame could be picked or generated based on frames adjacent to, and/or outside of, the set of 2.5 frames. In another embodiment, upsampling may be performed, which may involve duplication or interpolation of frames to add new frames to the sequence of image frames. For instance, to output two frames for every one frame of the sequence of image frames, upsampled frames could include simple duplicates of the original sequence of image frames. Alternatively, the upsampled frames could include interpolated versions of adjacent frames in the original sequence of image frames. Other methods are possible so as to downsample or upsample the sequence of image frames.

In response to a user interaction via the control interface, the slow motion effect may stop immediately, returning the live view representation to real time, or the live view representation may transition from slow motion to real time. For instance, a user may release his/her finger from the control interface. In response, the displayed representation may "speed up" in order to catch up with the real time scene.

For example, a user may touch the control interface so as to start the slow motion effect. The representation of the sequence of image frames may be displayed to the user as a "slowed down" version of the real world. The user may subsequently stop touching the touch-based control interface. In response, the representation of the sequence of image frames may display images at a higher rate than the original capture rate so as to "catch up" the live view representation with the real time scene.

As an alternative way to control the slow-motion effect, a user finger position may be changed on the touch-sensitive surface so as to adjust the speed of the representation. In other words, if for example a user moves her finger upward, the representation may speed up to actual speed or even faster than actual speed. Alternatively, if a user moves her finger down on the touchpad, the representation may slow down further. Other user interactions are possible so as to control the slow-motion effect via the control interface.

In some embodiments, the slow motion effect may be combined with the object or area selection effect. For example, upon pressing the control interface, a slow-motion effect may be initiated on the displayed representation, which may slow down fast-moving objects or individuals. The user may then move his/her finger on the control interface to cause a selection box to move around on the live-view representation. Once the selection box is moved to "select" the desired object or individual, the user may release the button, the displayed representation may return to real time and the selection box may persist, tracking the desired object or individual.

III. ILLUSTRATIVE METHODS

Figure 7:
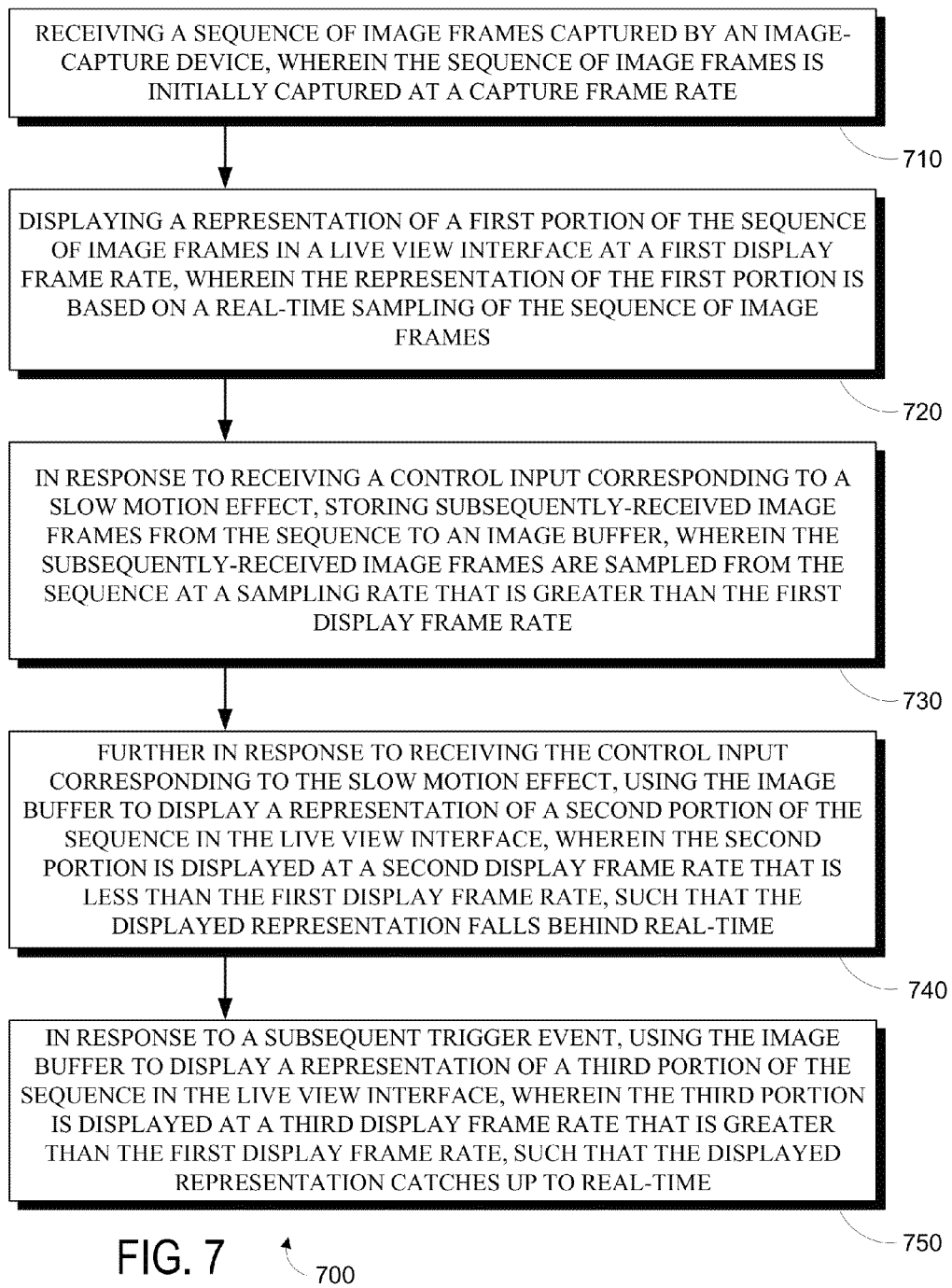
FIG. 7 is a flowchart of an example method, according to an illustrative embodiment.

FIG. 7 is a flowchart of a method 700 for providing a representation of sequence of image frames and applying a slow motion effect to the displayed representation, where the effect is controllable in real time via a control interface. Method 700 could be carried out with the systems described and illustrated in FIGS. 1A-6. Blocks need not be carried out in the order presented. Other systems and steps may be utilized to carry out method 700.

Block 710 includes receiving a sequence of image frames captured by an image-capture device. The sequence of image frames is initially captured at a capture frame rate. In other words, the sequence of image frames may be captured at a capture frame rate based on, for example, the capture frame rate of the image-capture device. For example, the sequence of image frames may be captured at 240 frames per second. Other capture frame rates are possible.

Block 720 includes displaying a representation of a first portion of the sequence of image frames in a live view interface at a first display frame rate. The representation of the first portion is based on a real-time sampling of the sequence of image frames. Put another way, in an example embodiment, the method may include a first time period or phase in which the displayed representation is substantially being displayed in real-time. In such a case, image frames may be sampled from the sequence of image frames at a rate equivalent to the first display frame rate. Note that the display frame rate discussed herein need not correspond with a physical display frame rate of a display or monitor. Rather, the display frame rates discussed herein may generally relate to an idealized display frame rate not limited by physical hardware.

Block 730 includes, in response to receiving a control input corresponding to a slow motion effect, storing subsequently-received image frames from the sequence to an image buffer. The subsequently-received image frames are sampled from the sequence at a sampling rate that is greater than the first display frame rate. Put another way, a user may interact with a control interface so as to create a control input corresponding to a slow motion effect. Subsequently, image frames may be sampled from the sequence of image frames and stored in the image buffer. The sampling rate in such a case will be higher than the first display frame rate so as to accumulate buffered image frames in the image buffer. As described above, sampling may be performed using several techniques that may include, but are not limited to: simple subsampling, binning, "smart interpolation", and/or upsampling.

Block 740 includes, further in response to receiving the control input corresponding to the slow motion effect, using the image buffer to display a representation of a second portion of the sequence in the live view interface. The second portion is displayed at a second display frame rate that is less than the first display frame rate, such that the displayed representation falls behind real-time. In an example embodiment, while in slow motion mode, the display frame rate may change such that the second display frame rate is less than that of the initial or first display frame rate. In such a situation, frames will accumulate in the image buffer.

Block 750 includes, in response to a subsequent trigger event, using the image buffer to display a representation of a third portion of the sequence in the live view interface. The third portion is displayed at a third display frame rate that is greater than the first display frame rate, such that the displayed representation catches up to real-time. In an example embodiment, a user or the control system itself may cause a subsequent trigger event. For instance, a user may take his finger off the control interface, signaling for the slow motion effect to be removed from the displayed representation. In another scenario, a number of buffered frames could approach, meet, or exceed a buffer threshold, in which case it would represent a triggering event. In response to the triggering event, the display frame rate may be increased so as to "fast forward" the displayed representation and "catch up" with real-time.

IV. ILLUSTRATIVE NON-TRANSITIVE COMPUTER READABLE MEDIUM

Some or all of the functions described above and illustrated in FIG. 7 may be performed by a computing device in response to the execution of instructions stored in a non-transitory computer readable medium. The non-transitory computer readable medium may be, for example, a random access memory (RAM), a read-only memory (ROM), a flash memory, a cache memory, one or more magnetically encoded discs, one or more optically encoded discs, or any other form of non-transitory data storage. The non-transitory computer readable medium may also be distributed among multiple data storage elements, which may be remotely located from each other. The non-transitory computer readable medium could be the computer readable medium 360 as described and illustrated in FIG. 3. The computing device that executes the stored instructions may include the computational subsystem 350 as described and illustrated in FIG. 3. Additionally or alternatively, the computing device may include another computing device, such as a server in a server network.

The non-transitory computer readable medium may store instructions executable by a computing device (e.g. computational subsystem 350 as described in reference to FIG. 3) to cause the computing device to perform any of the functions described herein. The functions may take the form of program instructions 370 as described and illustrated in FIG. 3.

V. CONCLUSION

Where example embodiments involve information related to a person or a device of a person, some embodiments may include privacy controls. Such privacy controls may include, at least, anonymization of device identifiers, transparency and user controls, including functionality that would enable users to modify or delete information relating to the user's use of a product.

Further, in situations where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method comprising:
receiving a sequence of image frames captured by an image-capture device, wherein the sequence of image frames is initially captured at a capture frame rate;
displaying a representation of a first portion of the sequence of image frames in a live view interface at a first display frame rate, wherein the representation of the first portion is based on a real-time sampling of the sequence of image frames;
in response to receiving a control input corresponding to a slow motion effect:
storing subsequently-received image frames from the sequence to an image buffer, wherein the subsequently-received image frames are sampled from the sequence at a sampling rate that is greater than the first display frame rate;
using the image buffer to display a representation of a second portion of the sequence in the live view interface, wherein the second portion is displayed at a second display frame rate that is less than the first display frame rate, such that the displayed representation falls behind real-time;
in response to a subsequent trigger event, using the image buffer to display a representation of a third portion of the sequence in the live view interface, wherein the third portion is displayed at a third display frame rate that is greater than the first display frame rate, such that the displayed representation catches up to real-time.

2. The method of claim 1, wherein the first portion is based on a real-time sampling at the display frame rate, the method further comprising:
further in response to receiving a control input corresponding to a slow motion effect, reducing the display frame rate such that the sampling rate is greater than the display frame rate.

3. The method of claim 1, wherein the first portion is based on a real-time sampling at the display frame rate, the method further comprising:
further in response to receiving a control input corresponding to a slow motion effect, increasing the sampling rate such that the sampling rate is greater than the display frame rate.

4. The method of claim 1, wherein the first portion is based on a real-time sampling at the display frame rate, the method further comprising:
further in response to receiving a control input corresponding to a slow motion effect, storing at least one artificial image frame in the image buffer.

5. The method of claim 4, wherein the at least one artificial image frame comprises at least one duplicate frame based on at least one of the image frames.

6. The method of claim 4, wherein the at least one artificial image frame comprises at least one interpolated frame based on at least two of the image frames.

7. The method of claim 1 further comprising in response to receiving a control input corresponding to a slow motion effect, immediately reducing the second display frame rate to a minimum of a display frame rate range.

8. The method of claim 1 further comprising in response to receiving a control input corresponding to a slow motion effect, gradually reducing the second display frame rate to a minimum of a display frame rate range.

9. The method of claim 1 further comprising in response to a subsequent trigger event, immediately increasing the display frame rate to match the capture frame rate.

10. The method of claim 1 further comprising in response to a subsequent trigger event,
increasing the third display frame rate gradually such that the third display frame rate becomes greater than the capture frame rate; and
in response to the subsequently-received image frames in the buffer reaching a buffer threshold, reducing the third display frame rate smoothly to match the capture frame rate.

11. A system comprising:
a live view interface configured to display a representation of at least a first, a second, and a third portion of a sequence of image frames, wherein the representation of the first portion is based on a real-time sampling of the sequence of image frames; wherein the representation of the first portion is displayed at a first display frame rate;
an image buffer;
a control interface; and
a control system configured to:
a) in response to receiving a control input corresponding to a slow motion effect, store subsequently-received image frames from the sequence into the image buffer, wherein the subsequently-received image frames are sampled from the sequence at a sampling rate that is greater than the first display frame rate;
b) use the image buffer to display a representation of the second portion of the sequence in the live view interface, wherein the second portion is displayed at a second display frame rate that is less than the first display frame rate, such that the displayed representation falls behind real-time;
c) in response to a subsequent trigger event, use the image buffer to display a representation of a third portion of the sequence in the live view interface, wherein the third portion is displayed at a third display frame rate that is greater than the first display frame rate, such that the displayed representation catches up to real-time.

12. The system of claim 11 wherein the control system is configured to, in response to receiving the control input, immediately reduce the display frame rate to a minimum of the display frame rate range.

13. The system of claim 11 wherein the control system is configured to, in response to receiving the control input, gradually reduce the display frame rate to a minimum of the display frame rate range.

14. The system of claim 11 wherein the control system is configured to, in response to the subsequent trigger event, immediately increase the display frame rate to match the capture frame rate.

15. The system of claim 11 wherein the control system is configured to, in response to the subsequent trigger event:
increase the display frame rate gradually such that the display frame rate becomes greater than the capture frame rate; and
in response to the number of buffered frames reaching a buffer threshold, reduce the display frame rate smoothly to match the capture frame rate.

16. The system of claim 11 wherein the control interface comprises a touch-sensitive surface.

17. The system of claim 11 wherein the control interface comprises a button.

18. A non-transitory computer readable medium having stored therein instructions executable by a computing device to cause the computing device to perform functions comprising:
receiving a sequence of image frames captured by an image-capture device, wherein the sequence of image frames is initially captured at a capture frame rate;
causing a representation of a first portion of the sequence of image frames to be displayed in a live view interface at a first display frame rate, wherein the representation of the first portion is based on a real-time sampling of the sequence of image frames;
in response to receiving a control input corresponding to a slow motion effect:
causing subsequently-received image frames from the sequence to be stored in an image buffer, wherein the subsequently-received image frames are sampled from the sequence at a sampling rate that is greater than the first display frame rate;
causing the image buffer to display a representation of a second portion of the sequence in the live view interface, wherein the second portion is displayed at a second display frame rate that is less than the first display frame rate, such that the displayed representation falls behind real-time;
in response to a subsequent trigger event, causing the image buffer to display a representation of a third portion of the sequence in the live view interface, wherein the third portion is displayed at a third display frame rate that is greater than the first display frame rate, such that the displayed representation catches up to real-time.

19. The non-transitory computer readable medium of claim 18 further comprising in response to receiving a control input corresponding to a slow motion effect, gradually reducing the second display frame rate to a minimum of a display frame rate range.

20. The non-transitory computer readable medium of claim 18 further comprising in response to a subsequent trigger event,
increasing the third display frame rate gradually such that the third display frame rate becomes greater than the capture frame rate; and
in response to the subsequently-received image frames in the buffer reaching a buffer threshold, reducing the third display frame rate smoothly to match the capture frame rate.

* * * * *